(12) United States Patent
Cullen et al.

(10) Patent No.: US 7,099,513 B2
(45) Date of Patent: Aug. 29, 2006

(54) BIT ALLOCATION PROCESS FOR MULTI-STAGE IMAGE COMPRESSION

(75) Inventors: Schuyler Cullen, Palo Alto, CA (US); Edward R. Ratner, Sunnyvale, CA (US); Rasmus Larsen, San Francisco, CA (US); David B. Kita, Milpitas, CA (US)

(73) Assignee: PTS Corporation, San Jose, CA (US)

( * ) Notice: Subject to any disclaimer, the term of this patent is extended or adjusted under 35 U.S.C. 154(b) by 775 days.

(21) Appl. No.: 10/175,510

(22) Filed: Jun. 18, 2002

(65) Prior Publication Data

US 2003/0231797 A1 Dec. 18, 2003

(51) Int. Cl.
G06K 9/36 (2006.01)
(52) U.S. Cl. ..................... 382/239; 382/251
(58) Field of Classification Search ................ 382/239, 382/251
See application file for complete search history.

(56) References Cited

U.S. PATENT DOCUMENTS

| | | | | |
|---|---|---|---|---|
| 5,414,469 A | * | 5/1995 | Gonzales et al. ...... 375/240.18 |
| 5,724,453 A | * | 3/1998 | Ratnakar et al. ............ 382/251 |
| 5,734,755 A | * | 3/1998 | Ramchandran et al. ..... 382/250 |
| 6,111,991 A | * | 8/2000 | Ribas-Corbera et al. .... 382/251 |
| 6,160,846 A | * | 12/2000 | Chiang et al. ......... 375/240.05 |
| 6,351,491 B1 | * | 2/2002 | Lee et al. ............... 375/240.03 |
| 6,925,120 B1 | * | 8/2005 | Zhang et al. .......... 375/240.08 |

OTHER PUBLICATIONS

"Bit-rate control using piecewise approximated rate-distortion characteristics," Lin, Liang-Jin and Ortega, Antonio, IEEE Transactions on Circuits and Systems for video Technology, No. 4, Vole. 8, Aug. 1998, pp. 446-459.*

Peter J. Burt, et al. "The Laplacian Pyramid as a Compact Image Code", IEEE Transactions on Communications, Apr. 1983, pp. 532-540, vol. Com-31 No. 4.

Xuan Kong, et al. "A Study of Pyramidal Techniques for Image Representation and Compression", Joural of Visual Communication and Image Representation, 1994, pp. 190-203, vol. 5; Johns Hopkins University, Baltimore, MD.

K. Metin, et al. "Optimal BIT Allocation In The Presence Of Quantizer Feedback", Proc. of ICASSP 1993, pp. 385-388, vol. 5; The David Sarnoff Research Center, Princeton, NJ.

(Continued)

Primary Examiner—Wenpeng Chen
(74) Attorney, Agent, or Firm—Okamoto & Benedicto LLP

(57) ABSTRACT

A process and apparatus for allocating bits between the stages of a multi-stage digital image compression scheme with quantizer feedback is disclosed. The process selects a quantization schedule (from a finite number of possibilities) for all stages that minimizes an estimate of total distortion while keeping total bit demand below a constraint; uses said schedule to actually quantize one stage of the compression scheme; selects a new quantization schedule for the remaining stages using estimates for distortion and bit demand that are updated to reflect the quantization of the previous stage; actually quantizes the next stage according to the new quantization schedule; and continues recursively until it has chosen an actual quantization scale for every stage of the compression scheme.

17 Claims, 11 Drawing Sheets

OTHER PUBLICATIONS

Pankaj Batra, et al. "Alternative Formulations for BIT Allocation with Dependent Quantization", submitted to IEEE Transactions on Image Processing, Nov. 2001 (24 pages); Department of Electrical Engineering, Columbia University, New York, NY.

Uwe Horn, et al. "Bit Allocation methods for closed-loop coding of oversampled pyramid decompositions", Proceedings of the IEEE International Conference on Image Processing, Oct. 1997, pp. 26-29, University of Erlangen-Nuremberg, Erlangen, Germany.

Kannan Ramchandran, et al. "Bit Allocation for Dependent Quantization with Applications to Multiresolution and MPEG Video Coders", IEEE Transactions on Image Processing, Sep. 1994, pp. 533-545, vol. 3, No. 5.

John G. Proakis, et al. "Digital Signal Processing: Principles, Algorithms, and Applications", 1996, pp. 72-85; Prentice-Hall, Inc. Upper Saddle River, New Jersey.

Claude E. Shannon, "Coding Theorems for a Discrete Source with a Fidelity Criterion", IRE Nat. . Conv/., 1959, pp. 142-163, Massachusetts Institute of Technology, Cambridge, Massachusetts.

U.S. Appl. No. 10/032,394, entitled, "Adaptive Transforms" filed Dec. 19, 2001.

U.S. Appl. No. 10/028,998, entitled, "Efficiently Adaptive Double Pyramidal Coding" filed Dec. 20, 2001.

* cited by examiner

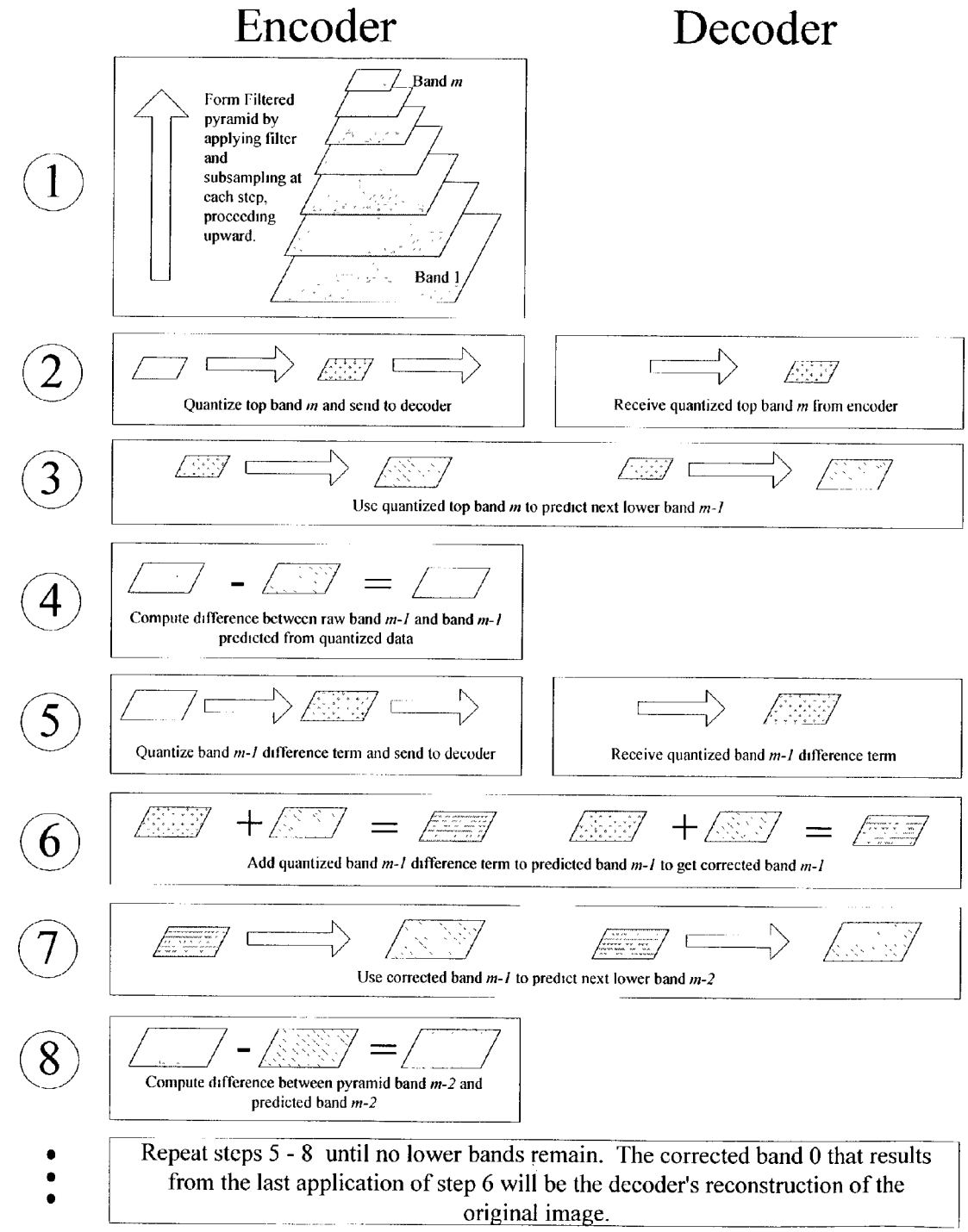
Fig. 4 - Background Art

| Quantization scale | Quantized bands | | | | Difference from Raw | | | | Perceptual error | Entropy |
|---|---|---|---|---|---|---|---|---|---|---|
| 1 | 121 | 152 | 180 | 175 | 0 | 0 | 0 | 0 | 0 | 4 |
| | 98 | 165 | 210 | 200 | 0 | 0 | 0 | 0 | | |
| | 54 | 104 | 151 | 140 | 0 | 0 | 0 | 0 | | |
| | 122 | 78 | 52 | 96 | 0 | 0 | 0 | 0 | | |
| 2 | 120 | 152 | 180 | 174 | 1 | 0 | 0 | 1 | 0.25 | 3.625 |
| | 98 | 164 | 210 | 200 | 0 | 1 | 0 | 0 | | |
| | 54 | 104 | 150 | 140 | 0 | 0 | 1 | 0 | | |
| | 122 | 78 | 52 | 96 | 0 | 0 | 0 | 0 | | |
| 8 | 120 | 152 | 176 | 168 | 1 | 0 | 4 | 7 | 16 | 3.625 |
| | 96 | 160 | 208 | 200 | 2 | 5 | 2 | 0 | | |
| | 48 | 104 | 144 | 136 | 6 | 0 | 7 | 4 | | |
| | 120 | 72 | 48 | 96 | 2 | 6 | 4 | 0 | | |
| 16 | 112 | 144 | 176 | 160 | 9 | 8 | 4 | 15 | 68 | 3.203 |
| | 96 | 160 | 208 | 192 | 2 | 5 | 2 | 8 | | |
| | 48 | 96 | 144 | 128 | 6 | 8 | 7 | 12 | | |
| | 112 | 64 | 48 | 96 | 10 | 14 | 4 | 0 | | |
| 32 | 96 | 128 | 160 | 160 | 25 | 24 | 20 | 15 | 296 | 2.43 |
| | 96 | 160 | 192 | 192 | 2 | 5 | 18 | 8 | | |
| | 32 | 96 | 128 | 128 | 22 | 8 | 23 | 12 | | |
| | 96 | 64 | 32 | 96 | 26 | 14 | 20 | 0 | | |

*Fig. 5b*

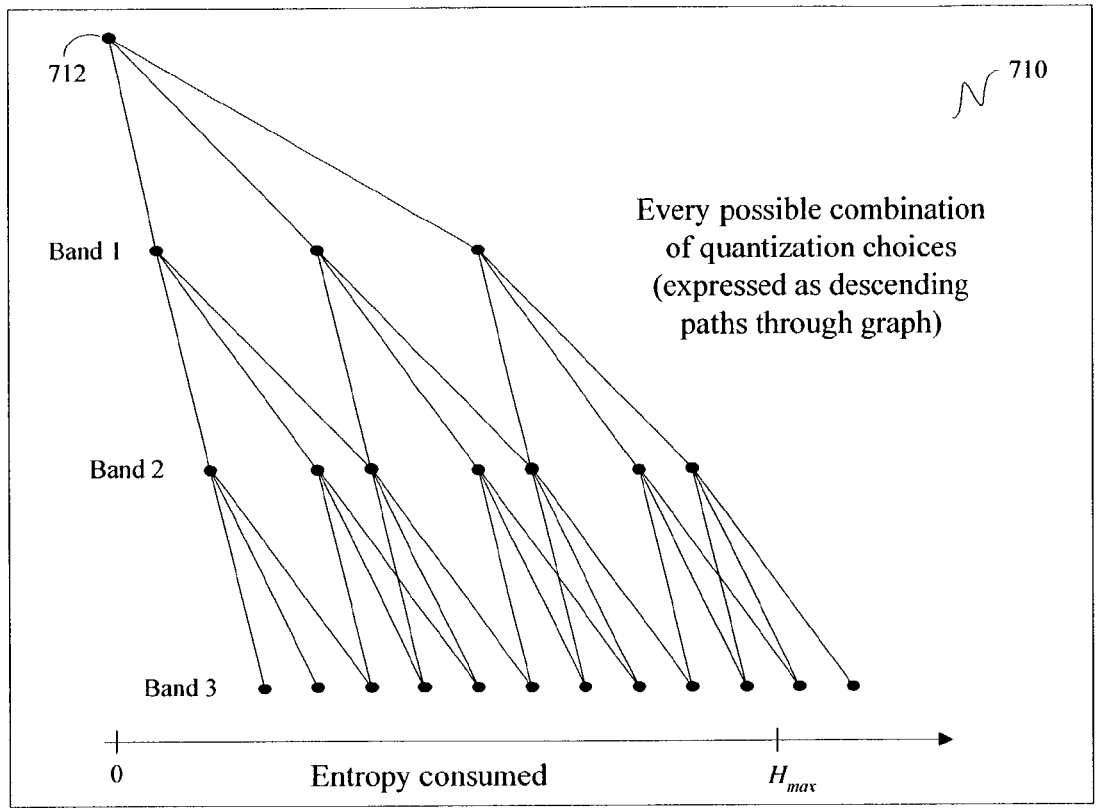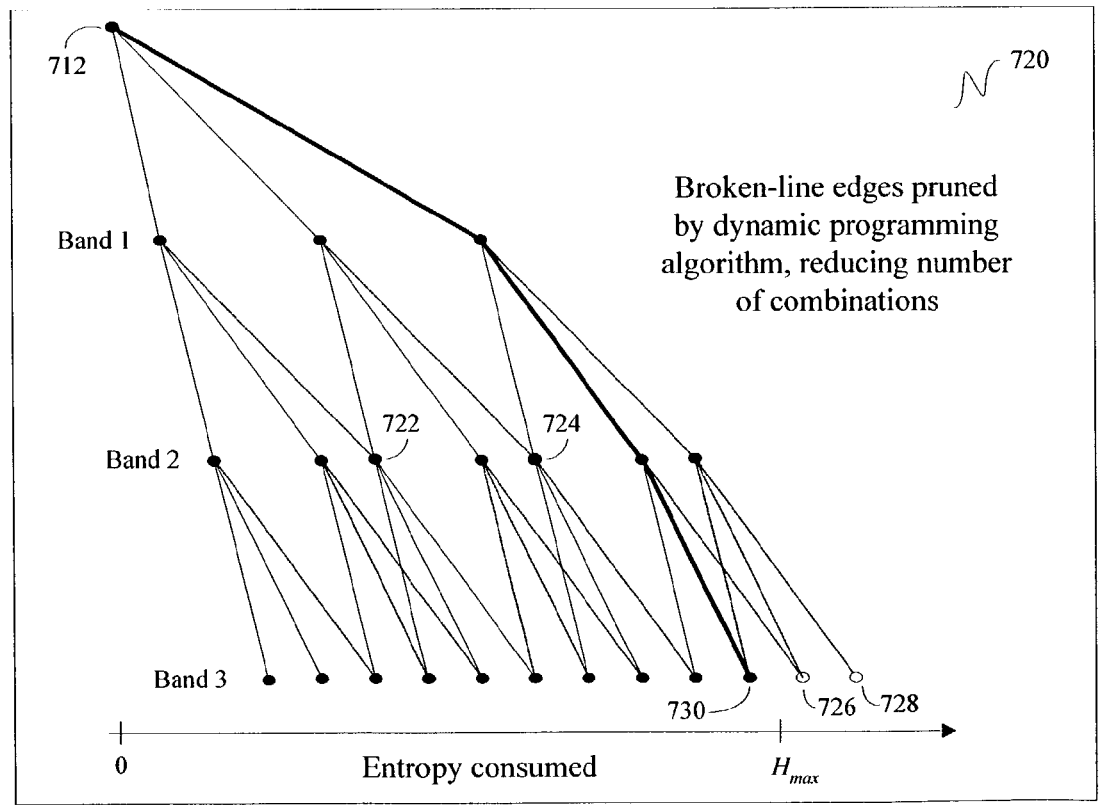
Figure 7b

BIT ALLOCATION PROCESS FOR MULTI-STAGE IMAGE COMPRESSION

CROSS-REFERENCES TO RELATED APPLICATIONS

The present application is related to co-pending U.S. patent application Ser. No. 10/028,998, "Efficiently Adaptive Double Pyramidal Coding," filed Dec. 20, 2001, the disclosure of which is incorporated herein by reference. The present application is also related to co-pending U.S. patent application Ser. No. 10/032,394, "Adaptive Transforms," filed Dec. 19, 2001, the disclosure of which is incorporated herein by reference.

REFERENCES CITED

C. E. Shannon, "Coding theorems for a discrete source with a fidelity criterion," *IRE Nat. Conv. Rec.* 4, pp. 142–163, 1959.

Peter J. Burt and Edward H. Adelson, "The Laplacian pyramid as a compact image code," *IEEE Transactions on Communications*, Vol. Com-31, No. 4, pp. 532–540, April 1983.

Xuan Kong and John Goutsias, "A study of pyramidal techniques for image representation and compression," *Joural of Visual Communication and Image Representation*, Vol. 5, pp. 190–203, 1994.

K. Metin Utz, Jerome M. Shapiro, and Martin Czigler, "Optimal bit allocation in the presence of quantizer feedback," *Proc. of ICASSP* 1993, Vol. 5, pp. 385–388.

Pankaj Batra, Alexandros Eleftheriadis, and Jay Sethuraman, "Alternative formulations for bit allocation with dependent quantization," Submitted to *IEEE Transactions on Image Processing*, November 2001.

Uwe Horn, Thomas Wiegand, and Bernd Girod, "Bit allocation methods for closed-loop coding of oversampled pyramid decompositions," *Proceedings of the IEEE International Conference on Image Processing*, 26–29 Oct. 1997, Santa Barbara, Calif.

Kannan Ramchandran, Antonio Ortega, and Martin Vetterli, "Bit allocation for dependent quantization with applications to multiresolution and MPEG video coders," *IEEE Transactions on Image Processing*, Vol. 3, No. 5, September 1994.

John G. Proakis and Dimitris G. Manolakis, *Digital Signal Processing: Principles, Algorithms, and Applications*, Prentice Hall: New Jersey, 1996.

BACKGROUND OF THE INVENTION

1. Field of the Invention

This invention relates in general to the field of video processing. In particular, this invention relates to bit allocation during digital image compression.

2. Description of the Related Art

A transition to digital technology has pervaded the communications, information, and entertainment industries in recent years. Digital images and digital video are proliferating and filling an important role in this technological conversion. Digital cameras, DVD movies, and streaming video over the World Wide Web provide a few examples of the ubiquity of digital images. But because digital images, and digital video in particular, contain large quantities of information, they can be costly in terms of storage capacity needed and bandwidth required for transmission. Thus, compression of the data required for storage or transmission is necessary, and consequently the problem of achieving more efficient compression has drawn significant attention.

A variety of techniques for image and video compression have been explored. For example, the H.261, H.263, JPEG, MPEG-1, MPEG-2, and MPEG-4 industry standards have employed various strategies with improving results over time. The feasibility of image compression derives from the fact that images often contain areas that are consistent, or correlated, in color (or in intensity, in the case of gray-scale images). Compression schemes seek to exploit these correlations by summarizing the data by regions rather than point by point. For instance, a typical digital image is stored as an array of pixels with a color value associated to each pixel. The array might be 720 by 480, and the color for each pixel might be represented by three (red, green, blue) component values ranging from 0 to 255. To digitally record three eight-bit numbers for each pixel in a 720 by 480 array requires at least $3 \times 8 \times 720 \times 480 = 8,294,400$ bits, or approximately 1 megabyte. But by noticing that in certain regions neighboring pixels have substantially the same color, one may avoid recording three eight-bit numbers for every pixel and instead record color data for each of several pixel regions, or use a smaller number of bits for some pixels.

In the case of a digital video sequence, one may also exploit the similarities between images that are close together in the sequence to further compress the data. For instance, rather than recording new data for a subsequent frame, one may retain the data for the previous frame and record only the differences between the subsequent frame and the previous frame. If the compression scheme successfully captures the similarities between frames in this way, these difference values for the subsequent frame will be substantially smaller than the original values for that frame's pixels. The crucial observation that makes compression possible is that these smaller values potentially require fewer bits to store. But in order to realize this advantage fully, one must take the additional step of quantizing the data, or replacing each numerical value with an approximation chosen from a discrete set of values. For example, rounding decimal numbers up or down to the nearest integer value is a standard case of quantization. Quantization is necessary because small decimals, for example 0.245, may require as many bits to encode as do large integer values, like 255. But when small numbers are rounded, for instance to integer values such as 0, 1 or −1, they require very few bits to encode. After quantization, the difference values mentioned above will often be small integers and will ideally include many zeros. A number of existing coding strategies dramatically conserve bits on zero values and small integers, so these difference values require far fewer bits to encode than the original values (which in the prototypical example are integers ranging up to 255).

Unfortunately, compression involving quantization comes with some cost in terms of image quality. As pixel values, or even difference values or other specifications for image reproduction generated by an encoder, are quantized, they no longer match exactly the data of the original digital image. Thus, the image reproduced by a decoder will not be exactly the same as the original image. For example, FIG. 1 illustrates the dramatic effect quantization can have. The original image 100 consists of a gradual smooth transition from black to gray to white. The new image 104 shows the result of quantizing (102) all gray-scale values between 0 and 255 into two values: black and white. Values between 0 and 127 are quantized as black, and values between 128 and 255 are quantized as white in this example of coarse quantization. While such a coarse approximation of an original image may be adequate for some purposes, clearly a large amount of information is lost resulting in a noticeable visual disparity between images 100 and 104.

The preceding example indicates an important trade-off in the field of image compression. Generally speaking, the smaller the number of bits used to encode a compressed image, the worse the distortion of that image will be. In fact, in "Coding theorems for a discrete source with a fidelity criterion," *IRE Nat. Conv. Rec.* 4, 142–163, 1959, C. E. Shannon showed that a theoretical limit for image quality versus compression can be found under certain assumptions on the class of images. A rate-distortion curve indicates the smallest distortion that is possible for a given bit rate allocation in image compression. A common situation in which this trade-off becomes important involves transferring image or video data under a constraint on the available bandwidth. If the bandwidth constraint is small enough to prevent expedient transfer of the full image or video, then a compression scheme becomes necessary. The desire arises to obtain the least possible distortion (i.e. the best possible image quality) while maintaining the bit rate allocation below the limit imposed by the constraint. The degree to which a compression strategy successfully allocates bits to preserve image quality while meeting its bit-rate constraint largely determines its viability in limited bandwidth applications.

Pyramidal Decomposition

The method of pyramidal image decomposition, which can be applied either to still images or to video, was introduced by Peter J. Burt and Edward H. Adelson in "The Laplacian Pyramid as a Compact Image Code," *IEEE Transactions on Communications*, Vol. Com-31, No. 4, April 1983. This method uses the correlation of color values within an image to take differences, resulting in small difference values that can be coded very efficiently. A variety of pyramidal decomposition schemes have been proposed, but the general approach is as follows. A base image $I_0$ is filtered (with some filtering function) and downsampled at a lower resolution resulting in $I_1$. Then, $I_1$ is filtered and downsampled at yet a lower resolution yielding $I_2$, and the process continues sequentially until a hierarchy (or pyramid) $I_0, I_1, \ldots, I_m$ of bands of decreasing resolution is generated. Burt and Adelson refer to this hierarchy of filtered and downsampled images layers (called "bands") as a Gaussian pyramid, due to the approximately Gaussian shape of the filtering function they employ. In this specification, a hierarchy of image bands formed by the above process with any filtering function and any method of downsampling is referred to as a Filtered Pyramid. FIG. 2*a* is a diagram showing the process for creating $I_{j+1}$ given $I_j$, comprising the steps of applying a filtering function (202) to the initial image 200 and then sampling pixels at a coarser scale (206) to create a new smaller-scale image 208. Next, a prediction function is applied to $I_m$ to create an approximation $J_{m-1}$ for band $I_{m-1}$, and this process continues sequentially until a hierarchy $J_{m-1}, \ldots, J_1, J_0$ of predicted bands is generated. The pyramid of predicted bands, $I_m, J_{m-1}, \ldots, J_1, J_0$, is herein referred to as a Predictive pyramid. For band i where i=0, 1, ..., m-1, let $E_i=I_i-J_i$ be the difference between the original band image and the predicted image. FIG. 2*b* illustrates the process of predicting $J_i$ from $I_{i+1}$ and computing the error terms $E_i$. If appropriate filtering and predicting functions are applied, then the $I_i$ and the $J_i$ should be very similar, resulting in small error terms $E_i$. In theory, the original image $I_0$ can be reconstituted using only $I_m$ and $E_{m-1}, \ldots, E_0, E_1$ since $J_{m-1}$ may be computed from $I_m$ by applying the prediction function, since $I_{m-1}=E_{m-1}+J_{m-1}$, and since one may recursively apply the predict function and add the error term until one arrives at $I_0$. Thus, a decoder can generate the original image $I_0$ if it is given only data for $I_m$ and $E_0, E_1, \ldots, E_{m-1}$. Burt and Adelson refer to their "difference" pyramid composed of $I_m$ at the top level and $E_{m-1}, \ldots, E_1, E_0$ at the lower levels as a Laplacian pyramid. The more general term Difference pyramid is used herein to refer to this collection of $I_m$ and $E_{m-1}, \ldots, E_1, E_0$.

FIG. 3 illustrates a typical Difference pyramid. In this example, the bands of the pyramid (300) have been generated by the process described above, so that the top band is a coarse approximation of an original image and the lower bands provide error terms that may be used to reconstruct the original image in a downward sequential fashion. Each band consists of an array of pixel values (302). For example, for a color image these values may have three components for three colors (red, green, blue), and each component value may be an integer between 0 and 255. In FIG. 3, each higher band is a smaller array than the band below. Note however that in general the sizes of the bands need not differ (e.g. the subsampling step could sample fully at the same resolution).

Since $I_m$ is of very low resolution (i.e. contains few pixels), it requires few bits to encode. If the small error terms $E_i$ are quantized, then they will also require very few bits. As a consequence, encoding $I_m$ and all of the $E_i$ (after quantization) can result in substantial savings over encoding the original image $I_0$ directly.

As stated before, the quantization step is crucial to realize this potential compression. But when the $E_i$ are quantized yielding $Q(E_i)$, in general the equations $Q(E_i)=I_i-J_i$ will no longer be exactly true. Even worse, the quantization errors introduced at higher levels of the pyramid will propagate throughout the calculations (this is called quantizer feedback), causing inaccurate predictions $_i$ and causing the errors at lower levels to be magnified. As a result, the decoder will not be able to reconstruct an exact copy of the original image $I_0$. A successful pyramidal coding scheme seeks to quantize carefully in order to keep the number of bits required below some bound while minimizing the amount of distortion.

When one considers the application of pyramid decomposition to image or video compression, the importance of the dependent nature of quantization choices becomes clear. By "dependent" it is meant that at least one later stage is affected by the quantization scale selected for an earlier stage of the compression scheme. In such applications, an encoder seeks to compress the data for an image into a smaller number of bits, and a decoder reconstructs an approximate image from this compressed data. A pyramid is useful for compression because the decoder can apply the prediction function to predict a lower band once it knows the next highest band, reducing the amount of data that must be transferred. Two primary coding strategies, open-loop coding and closed-loop coding, have divergent effects on the accumulation of quantization error during the reconstruction process.

In open-loop coding, the encoder sequentially quantizes and transmits the bands of the Difference pyramid to the decoder. At each stage, the decoder uses the previous reconstructed band to predict the next lower band, then it adds the quantized error term (from the Difference pyramid) sent by the encoder to this prediction in order to "correct" it, or bring it closer to the corresponding band in the Filtered pyramid. Using the above notation, the decoder reconstructs $\hat{I}_i = \hat{J}_i + Q(E_i)$, where the hat symbol denotes that these values differ somewhat from the $I_i$ and $J_i$ in the Filtered and Predictive pyramids, respectively. At each stage of this process, the decoder's prediction differs from the corresponding predicted band in the Predictive pyramid (i.e. $Î_i$ differs from $J_i$) because the decoder makes its prediction from quantized rather than raw data. But the error term $Q(E_i)$ sent to correct this prediction at each stage is designed to correct the corresponding band in the Predictive pyramid, not the decoder's flawed prediction. So even before the error term is quantized, it is clear that it will not correct the discrepancy due to quantization at the previous step. Since the error term is also quantized before reaching the decoder, even more of a discrepancy is introduced. In this way, quantization error mounts at each stage of the open-loop coding process.

In contrast, closed-loop coding seeks to correct the error due to quantization at each new step in the process. Whenever the encoder sends data for a band, some error is again introduced by quantization. Thus, at band i<m the decoder will create a prediction, $Î_i$ that differs from $J_i$ in the Predictive pyramid as before. However, rather than merely encoding the error term contained in the $i^{th}$ band of the Difference pyramid, as in open-loop coding, the encoder performs the same prediction $Î_i$ from quantized data that the decoder performs and subtracts it from $I_i$ in the Filtered pyramid to create a more accurate error-correction term, $Ê_i = I_i - Î_i$. Note that this error term cannot be found until after the previous band has already been reconstructed, in contrast to open-loop coding. This term is more accurate because it forces the equation $I_i = Î_i + Ê_i$ to hold. Of course, this error term is quantized before reaching the decoder, so the decoder reconstructs $Î_i + Q((Ê_i))$, which still differs from the original $I_i$. But the discrepancy at this stage is only due to the most recent quantization error.

FIG. 4 illustrates the stepwise closed-loop process from the perspective of both the encoder and the decoder. In step 1, the encoder forms m bands by sequentially filtering and subsampling the previous band, resulting in a Filtered pyramid. In step 2, the encoder quantizes the top band m and sends the quantized data to the decoder, while the decoder receives said quantized data for band m. In step 3, the encoder and the decoder use an identical process to predict band m−1 using the quantized data for band m. In step 4, the encoder computes a band m−1 difference term by subtracting the predicted band m−1 of step 3 from the raw band m−1 of the Filtered pyramid. In step 5, the encoder quantizes the band m−1 difference term and sends the quantized data to the decoder, while the decoder receives said quantized data for band m−1. In step 6, the encoder and the decoder both add the quantized band m−1 difference term to the predicted band m−1, resulting in a corrected band m−1. In step 7, the encoder and the decoder use an identical process to predict the next lower band m−2 using the corrected band m−1. In step 8, as in step 4, the encoder computes a band m−2 difference term by subtracting the predicted band m−2 of step 7 from the raw band m−2 of the Filtered pyramid. The last box indicates that analogues of steps 5 through 8 should be repeated until no lower bands remain. At this stage, the corrected band 0 will be the decoder's reconstruction of the original image.

The filtering and predicting functions employed by Burt and Adelson and in many other pyramidal decomposition schemes are linear functions. If a function $\Phi$ is applied to an image I (an image is here conceived as a map assigning a numerical color value to each pixel in an array of pixels), we refer to the resulting image as $\Phi(I)$. The function $\Phi$ is linear if two conditions are satisfied: 1) For any two images A and B, $\Phi(A+B) = \Phi(A) + \Phi(B)$, and 2) For any constant number c, then $\Phi(cA) = c\Phi(A)$. A function that does not satisfy the above two conditions is called nonlinear. A number of proposed pyramidal decomposition schemes employing nonlinear filtering and predicting functions promise more efficient compression than linear pyramidal schemes. For example, in "A study of pyramidal techniques for image representation and compression," *Journal of Visual Communication and Image Representation*, 5 (1994), pp. 190–203, Xuan Kong and John Goutsias compare several linear and nonlinear pyramid decomposition schemes and draw experimental conclusions regarding which filtering and predicting functions produce the best results. However, the use of nonlinear filters can complicate the propagation of quantization errors throughout the process of reconstructing a compressed image, so special attention must be paid to the allocation of bits among the various bands. In particular, because of the effects of nonlinear functions on quantization error, the closed-loop coding process described above is often employed. But determining how to allocate bits for such a closed-loop process is a nontrivial problem.

K. Metin Uz, Jerome M. Shapiro, and Martin Czigler propose a method for allocating bits in a closed-loop pyramidal coding scheme in their paper "Optimal bit allocation in the presence of quantizer feedback," *Proc. of ICASSP 1993*, Vol. 5, pp. 385–388. In this method, the rate-distortion curves for each band are assumed to be of a simplified parametric form, and modeling is required to estimate the values of the parameters for these curves. Based on these assumptions, the authors use the method of Lagrange multipliers to calculate a closed form optimal solution that depends on the chosen parameters and a Lagrange multiplier (which can be approximated using iterative techniques).

In the unpublished manuscript "Alternative formulations for bit allocation with dependent quantization," authors Pankaj Batra, Alexandros Eliftheriadis, and Jay Sethuraman provide an integer-programming formulation of the dependent quantization bit allocation problem. They use linear and Lagrange relaxations with randomized rounding to find approximate solutions. Since their formulation only takes account of first-order dependencies (e.g. between adjacent bands) and because it is aimed at temporal rather than spatial dependencies, it does not provide an accurate solution for a multiple-band pyramidal coding problem.

In "Bit allocation methods for closed-loop coding of oversampled pyramid decompositions," *Proceedings of the IEEE International Conference On Image Processing*, 26–29 Oct. 1997, Santa Barbara, Calif., authors Uwe Horn, Thomas Wiegand, and Bernd Girod derive an optimal bit allocation model for closed-loop pyramidal coding under certain assumptions. They assume a Gaussian source to derive equations relating distortion to bit rate and use the method of Lagrange multipliers to find an analytical solution to the bit allocation problem. They note that this optimal solution actually results in large distortions at lower-resolution bands of the pyramid, so they propose using the optimal bit allocations for the simpler open-loop coding within the closed-loop scheme to achieve less distortion across all bands.

In "Bit allocation for dependent quantization with applications to multiresolution and MPEG video coders," *IEEE Transactions on Image Processing*, Vol. 3, No. 5, September 1994, authors Kannan Ramchandran, Antonio Ortega, and Martin Vetterli discuss an operational approach to allocating bits within compression schemes with quantizer feedback using a discrete set of quantizer choices. This approach requires no assumptions about the input data or quantizer characteristics, unlike the Horn/Wiegand/Girod calculation. The optimal bit allocation/distortion balance is found by minimizing a Lagrangian cost dependent on a Lagrange multiplier parameter, then iterating by adjusting until the solution found satisfies the original bit constraint. This iterative approach approximates the actual optimal allocation for closed-loop pyramidal coding but its computational complexity increases exponentially with the number of bands in the pyramid.

SUMMARY OF THE INVENTION

The present invention provides a new process for allocating bits in an image or video compression scheme. More specifically, the process applies to multi-stage compression schemes in which quantizer feedback occurs, such as pyramidal image decomposition. In such schemes, one or more later stages are dependent upon the outcome of quantization at an earlier stage of compression. Such quantizer feedback complicates the process of allocating bits between the various stages of compression because quantization errors at one stage can dramatically affect the data generated in later stages of the compression scheme. The disclosed process dynamically allocates bits between the various stages so that distortion of the reconstructed image is minimized. The present invention also discloses an apparatus for allocating bits in a multi-stage image compression scheme with quantizer feedback. One embodiment of the invention relates to a process for allocating bits for a multi-stage digital image compression such that image quality is optimized subject to a constraint on maximum bit allowance. The process selects a quantization schedule (from a finite number of possibilities) for all stages that minimizes an estimate of total distortion while keeping total bit demand below a constraint. The process further uses said schedule to actually quantize one stage of the compression scheme, selects a new quantization schedule for the remaining stages using estimates for distortion and bit demand that are updated to reflect the quantization of the previous stage, and actually quantizes the next stage according to the new quantization schedule. The process then continues recursively until it has chosen an actual quantization scale for every stage of the compression scheme.

BRIEF DESCRIPTION OF THE DRAWINGS

A further understanding of the nature and the advantages of the invention disclosed herein may be realized by reference to the remaining portions of the specifications and the attached drawings.

FIG. 4 summarizes a closed-loop pyramidal coding process from the perspectives of both the encoder and the decoder.

FIG. 5b is an example of the calculation of perceptual errors and entropies for various quantization scales.

FIG. 7b is an illustration of a dynamic programming approach to selecting a quantization schedule.

To aid in understanding, identical reference numerals have been used wherever possible to designate identical elements in the figures.

DETAILED DESCRIPTION OF THE SPECIFIC EMBODIMENTS

1 Introduction

Figure 1:
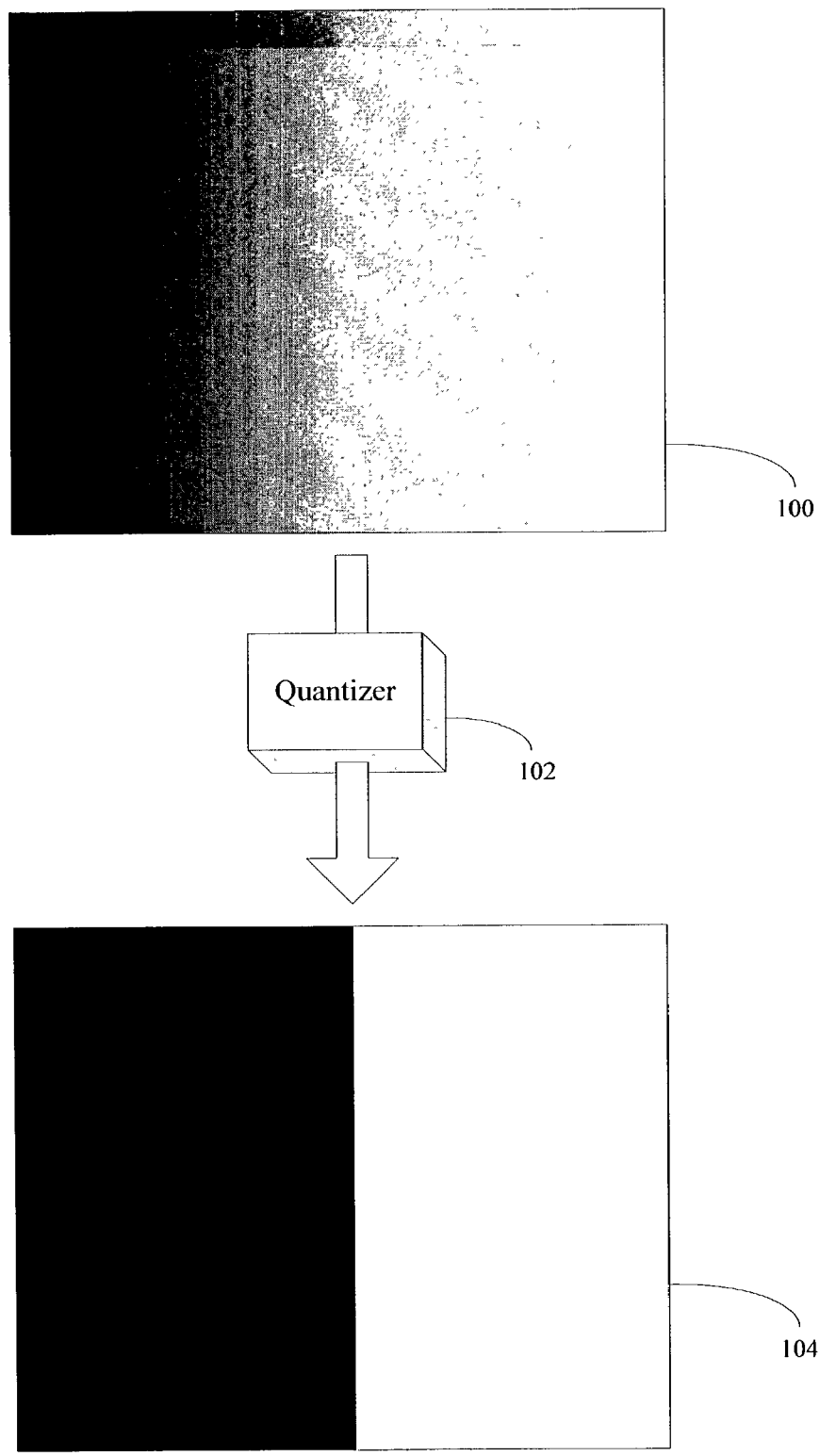
FIG. 1 is an example of the result of coarse quantization.
Figure 2A:
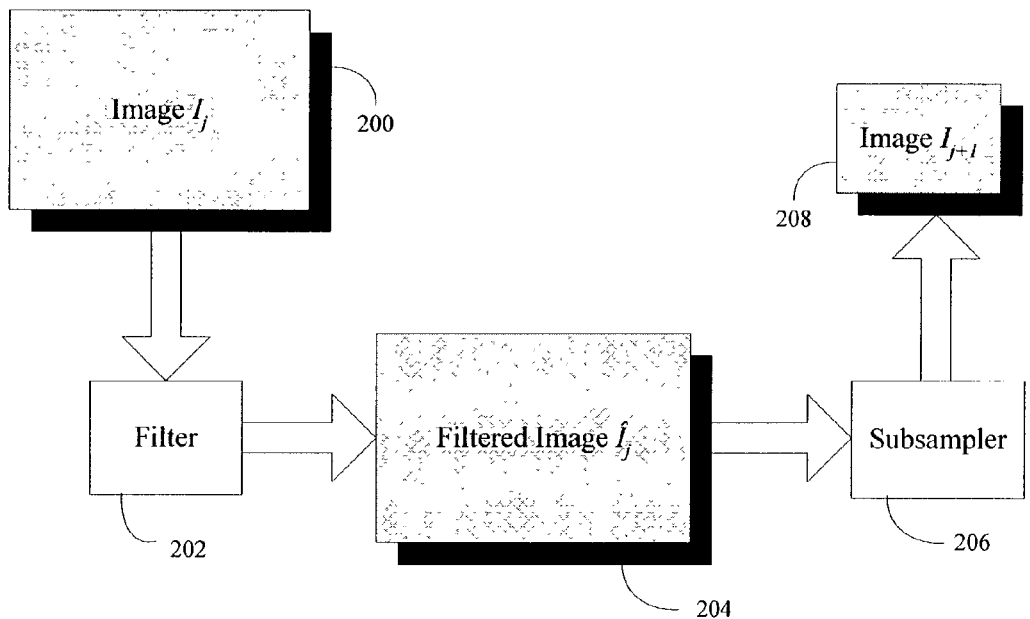
FIG. 2 illustrates the process of filtering and downsampling an image at a coarser scale and then using this coarser image to predict the original image.
Figure 2B:
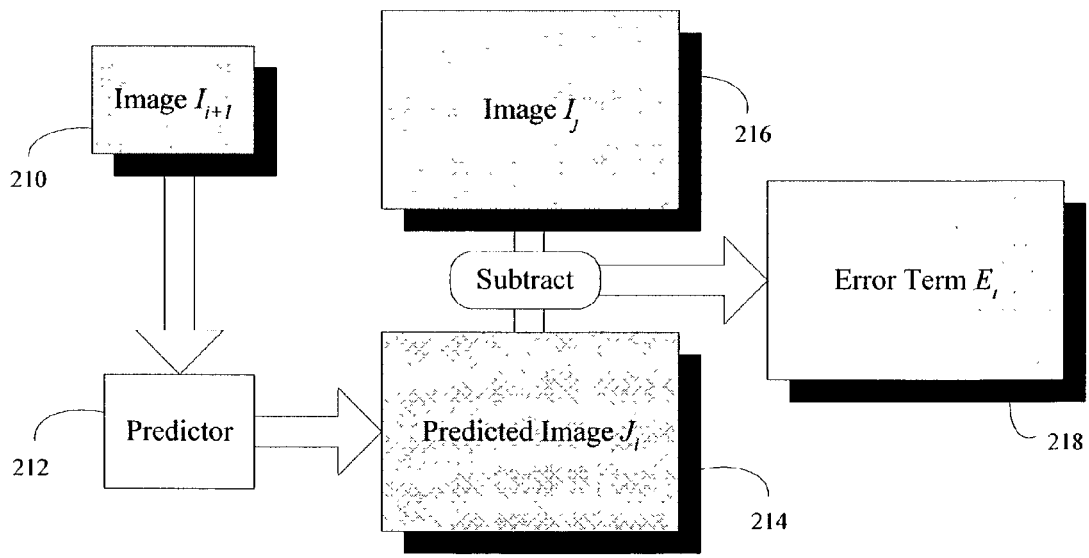
Figure 3:
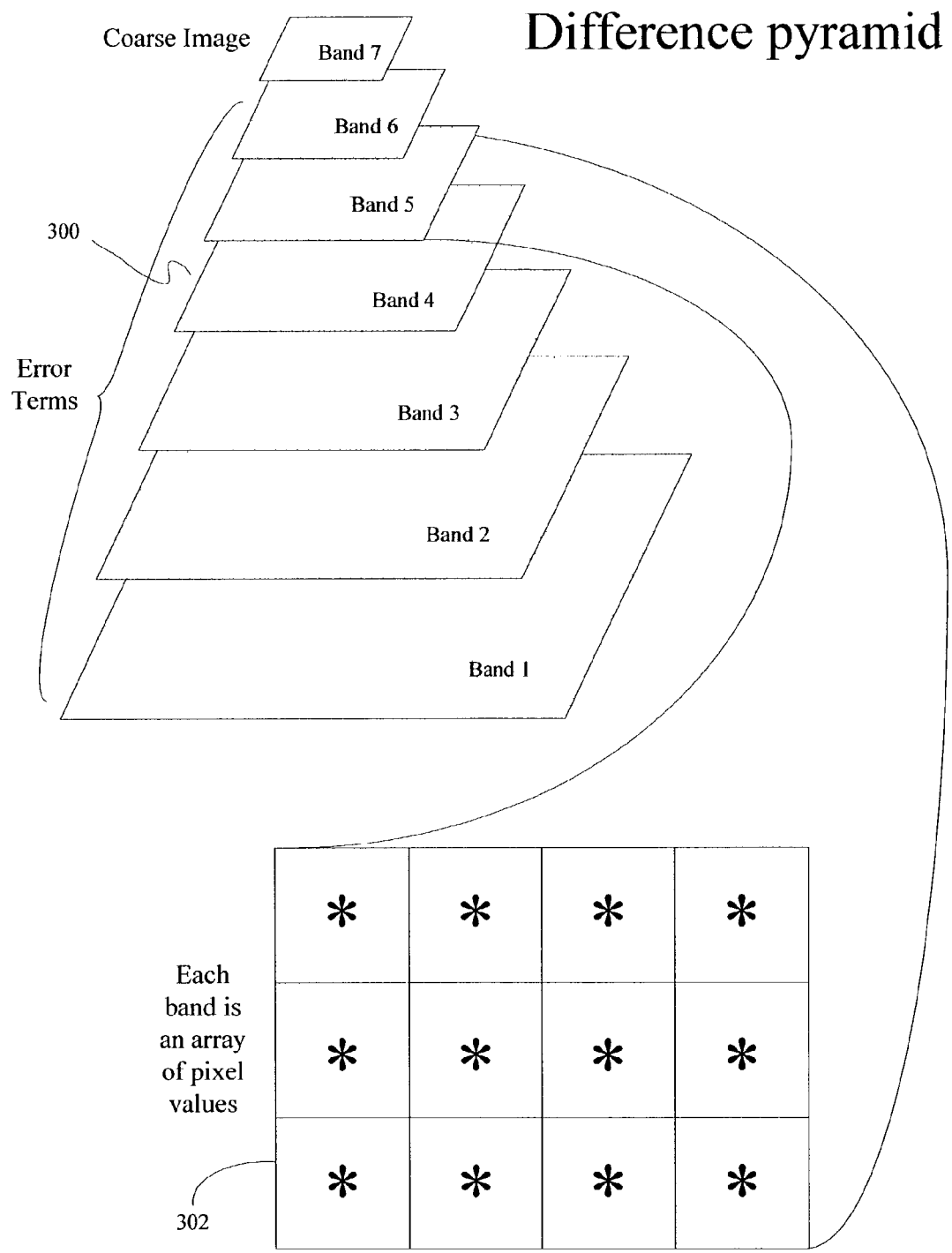
FIG. 3 illustrates a Difference pyramid.

The present invention provides a process for allocating a constrained number of bits between different stages of an image compression scheme in such a way as to maximize image quality. It is envisioned that this bit allocation process may be carried out by an encoder that is designed to work in conjunction with a decoder to compress, transfer, and reconstruct image data.

The preferred embodiment may be applied to an image or video compression scheme that involves pyramidal image decomposition. While the invention applies to any multi-stage image compression scheme in which quantization choice at one stage affects at least one other stage, for clarity of discussion this description focuses on the preferred embodiment, which allocates bits within a pyramidal coding scheme. Refer to the Description of the Related Art for a discussion of pyramidal coding.

The bands, or levels, of the pyramidal representation will be ordered from bottom to top. So, in the case of a pyramid with m levels, the bottom level will be called band 1, the next level band 2, and so on up to the top level band m. These bands are sequentially used to encode the image, so they represent a plurality of stages in the compression process. The preferred embodiment of the present invention dynamically assigns a quantization scale to each of these bands so that, after quantization, data for all bands can be transmitted under a maximum bit allowance $R_{max}$. The present invention further guarantees that these quantization scales are distributed in an efficient way, ensuring minimal distortion of the final image.

The preferred embodiment of the present invention marks a significant advance in that it provides a way of using information about all bands to recursively assign a quantization scale (and thus a bit allocation) to each band during closed-loop coding. Prior techniques for closed-loop coding (as discussed above in the Description of the Related Art) typically assign all quantization scales at once based on certain assumptions about the rate-distortion characteristics of the various bands or assign them recursively without properly accounting for dependencies among all bands. In simpler prior art strategies, optimal allocations for open-loop coding (which are significantly easier to determine) are used during closed-loop coding. The present invention finds an intermediate strategy which exploits the simplicity of the open-loop allocation problem to compute estimates yet which adjusts dynamically so that new information produced through closed-loop coding is used recursively to improve these estimates. This hybrid approach provides a computationally tractable way to approach the optimal distribution of bits during closed-loop coding.

The preferred embodiment computes estimates for an optimal distribution of quantization scales between all bands by solving the open-loop problem, but it only assigns a scale to one band at a time. After each assignment is made, a new approximate optimal distribution is computed for all remaining bands taking into account the quantization scales that have already been assigned, so that a more accurate estimate is made at every step. This new process successfully compensates for quantizer feedback for either linear or nonlinear pyramidal decompositions.

In the preferred embodiment, the pixel values for each band of the Difference pyramid are summarized in histograms, which list the number of pixels in that band whose values lie in each of several numerical ranges. Different choices for these numerical ranges, or bins, will correspond to different quantization scales and will result in different histograms. These histograms are used to compute two quantities that will be used later in the process to determine bit allocation: a bit demand measure and a distortion term. The bit demand measure may be any measure of the bit demand associated with the histogrammed data, such as, for example, entropy. The entropy of a quantized band is directly proportional to the smallest possible bit allocation that can be achieved for that band through efficient entropy coding techniques, so it provides a good measure of the bits required for a given band. Entropy is defined as follows: If a histogram has n bins, the $i^{th}$ bin contains $N_i$ entries, and $$N = \sum_{i=1}^{n} N_i,$$

then the entropy is $$H = -\left(\frac{1}{N}\right)\sum_{i=1}^{n} N_i \log_2\left(\frac{N_i}{N}\right),$$

where by convention $$N_i \log_2\left(\frac{N_i}{N}\right)$$

is taken to equal zero when $N_i=0$. While this specification refers regularly to entropy as a preferred bit demand measure, any other suitable bit demand measure may replace entropy in other embodiments of the invention. The distortion term may be any measure of how much the quantized data at a band differs from raw data for the same band (as found in the unquantized Difference pyramid). The distortion term is also referred to herein as perceptual error. In one embodiment, the perceptual error may be defined as follows: If $d_{ij}$ as i goes from 1 to $M_j$ is an ordering of all pixel values in band j of a Difference pyramid (where $M_j$ is the total number of pixels in band j), and $Q(d_{ij})$ represents the new pixel value for $d_{ij}$ after quantization, then the perceptual error for band j under this quantization scale is $$P_{error}^j = w_j \sum_{i=1}^{M_j} [Q(d_{i,j}) - d_{i,j}]^2,$$

where $w_j$ is a weighting factor. A variety of other measures of perceptual error may be contemplated, and any such measure is compatible with use by the process disclosed in the present invention. The measure of perceptual error defined above, which is referred to herein as "weighted squared error," is provided for illustrative reasons. When the weighting factors $w_j$ are chosen to equal the reciprocal of the number of pixels in band j, this measure is referred to in the background literature as "mean squared error," or MSE. In an alternative embodiment, peak signal-to-noise ratio (PSNR) may be used as a measure of perceptual error. In the current context, assuming pixel values are expressed using b bits, PSNR is defined as $$PSNR = 10 \log_{10}\left(\frac{(2^b - 1)^2}{MSE}\right).$$

Also note that when numerical values are quantized, two types of choices must be made: where will the dividing points for the bins be, and what representative numerical value will be attached to each bin. As defined above, entropy depends only on the choice of dividing points for the bins, but perceptual error depends also on the actual representative values given to the quantized data. For example, one may quantize the real number line with quantization scale 2, separating the number line into bins . . . [−2,0), [0,2), [2,4), [4,6), . . . and so on. In this example, every real number will be replaced with one representative value for the bin in which it lies. One might assign the midpoints of each bin (e.g. . . . , −1, 1, 3, 5, . . . ) as these representative values, but of course many other choices are possible, and these choices will affect the perceptual error (as defined above) of a given data set. The process disclosed herein is compatible with any method of selecting quantization bins and their representative values. In particular, bins need not all be of the same size, as in the scale 2 example above. Nonetheless, for simplicity of discussion, the phrase "quantization scale" is used herein to refer to a possible quantization choice for a given band. "Quantization schedule" is used to refer to a combination of quantization scales for several different bands.

Figure 5A:
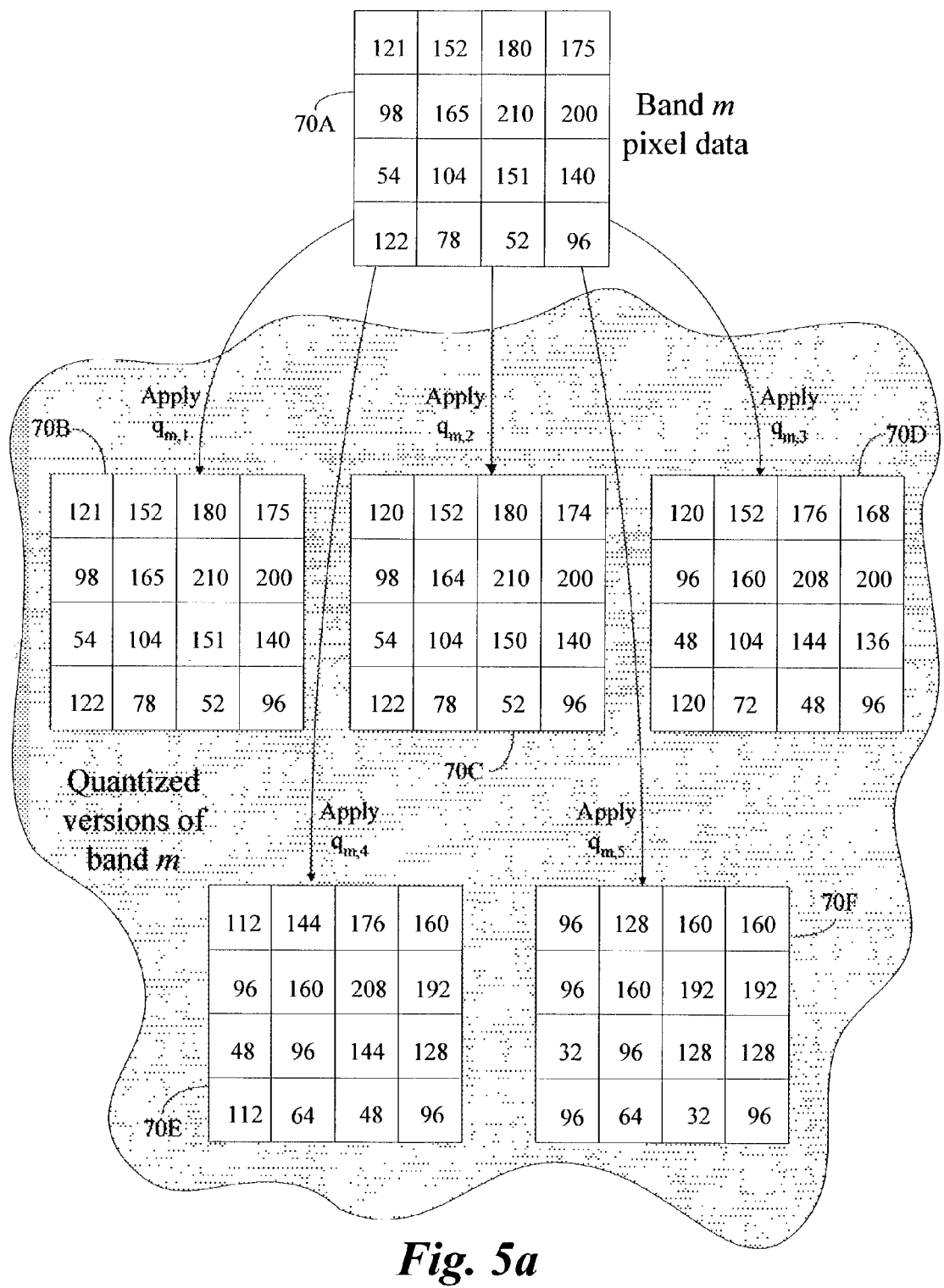
FIG. 5a is an example of quantization of an array of pixels.

FIGS. 5a and 5b provide an example of the collection of perceptual error and entropy data associated with different quantization scales for a band consisting of a 4 by 4 grid of pixels. In FIG. 5, the band 70A is assumed to be the top band (band m) of a difference pyramid, and it contains monochromatic color values for each pixel that lie between 0 and 255. Five quantization choices (quants), $q_{,m,1}$, $q_{,m,2}$, $q_{,m,3}$, $q_{,m,4}$, $q_{,m,5}$, are used to quantize band 70A. Quant $q_{,m,1}$ has a quantization step size of 1, and it takes each number to the greatest integer less than or equal to that number. Since band 70A consists of integer color values, quant $q_{,m,1}$ produces a new quantized band 70B that is identical to 70A. Quant $q_{,m,2}$ has a quantization step size of 2, and it takes each number to the largest multiple of 2 that is less than or equal to that number. Quant $q_{,m,2}$ produces a new quantized band 70C. Quant $q_{,m,3}$ has a quantization step size of 8, and it replaces each number with the largest multiple of 8 that is less than or equal to that number. Quant $q_{,m,3}$ produces a new quantized band 70D. Quant $q_{,m,4}$ has a quantization step size of 16, and it replaces each number with the largest multiple of 16 that is less than or equal to that number. Quant $q_{,m,4}$ produces a new quantized band 70E. Finally, quant $q_{,m,5}$ has a quantization step size of 32, and it replaces each number with the largest multiple of 32 that is less than or equal to that number. Quant $q_{m,5}$ produces a new quantized band 70F. As mentioned above, other representative values could be assigned for each bin at any of these quantization scales, but for simplicity in this example the smallest value in each bin is used.

FIG. 5b is a chart summarizing statistics for each quantized band. A first column lists the quantization scale used to produce the corresponding band (one of 70B, 70C, 70D, 70E, and 70F) in the second column. A third column shows the difference between the raw band 70A and each quantized band. A fourth column lists the perceptual error for each quantized band, where perceptual error is computed as MSE, as defined above. A fifth column lists the entropy for each band, where entropy is computed using the formula described above.

The preferred embodiment is a process comprised of several sequential steps, which will be outlined in detail below. In summary, the process is designed to consider a finite number of possible quantization scales for each band of a pyramid image decomposition and to recursively select quantization scales for the bands of the pyramid under a total bit constraint. The bit constraint, $R_{max}$, imposes a cap, $H_{max}$, on the maximum entropy allowable for the collection of quantized bands. Since in general finer quantization scales correspond to higher entropies, coarse quantization at some bands of the pyramid may be required in order to avoid exceeding the entropy cap. The present invention determines a way to distribute such quantization compromises that will approach the distribution with the least possible distortion in the reproduced image.

2 Bit Allocation Process

The bit allocation process of the preferred embodiment described herein requires several pieces of information as input. The Filtered pyramid (formed by filtering lower bands and downsampling) and the Predictive pyramid (created by predicting each band from the band above in the Filtered pyramid using a prediction function) for an image are the primary input data. The prediction function with which the Predictive pyramid is formed is also assumed as an input. A finite number of possible quantization scales for each band of the pyramid (which may be either predetermined statically or determined dynamically) from which an optimal combination should be selected is input into the process as well. For each band and for each possible quantization scale, the entropy and the perceptual error associated with that band and with that quantization scale is used. This information is updated periodically during the process, but the initial information will be based on the Difference pyramid.

Figure 6:
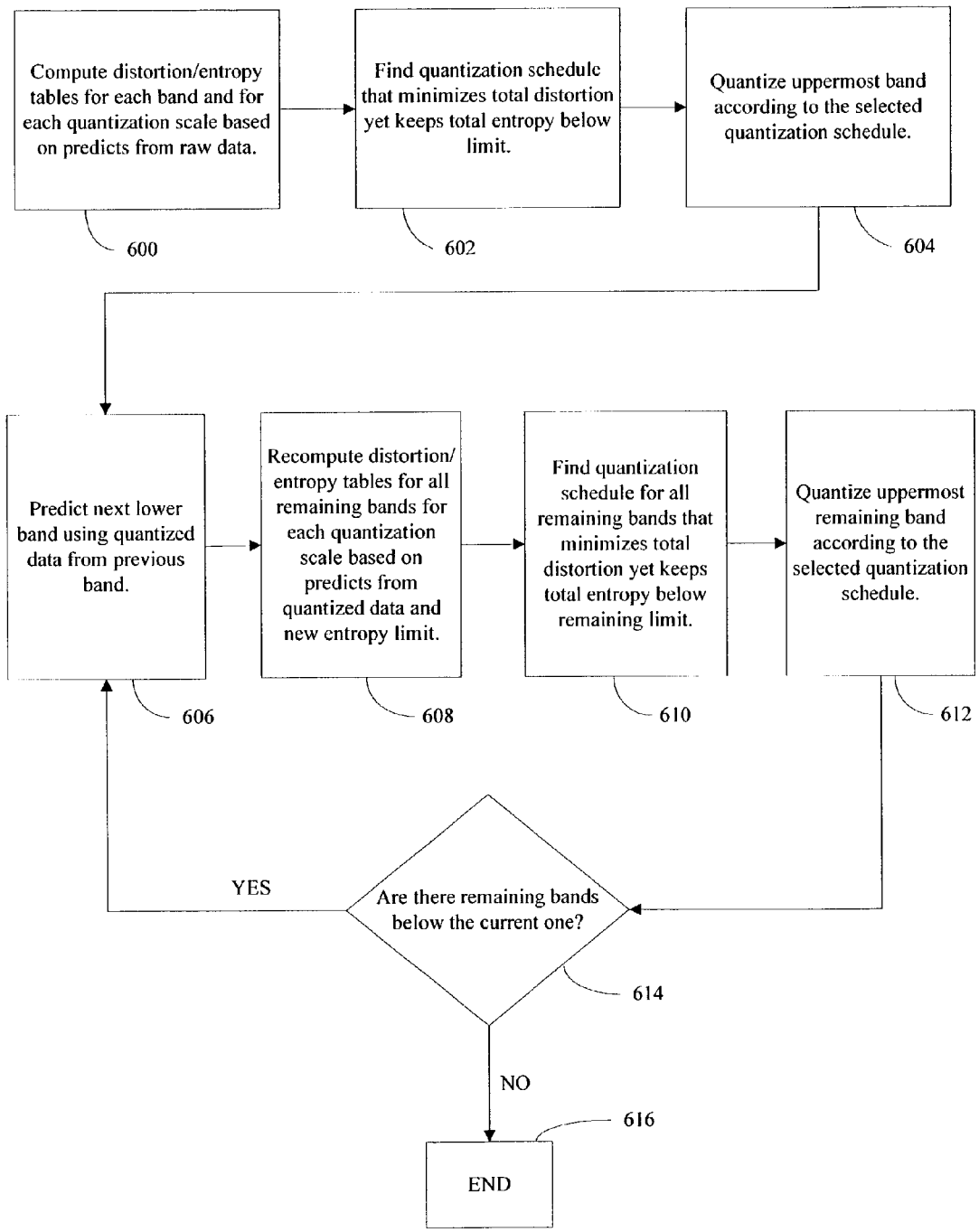
FIG. 6 is a flow chart illustrating steps of the bit allocation process in accordance with an embodiment of the invention.

FIG. 6 is a flow chart summarizing steps involved in the bit allocation process in accordance with an embodiment of the invention. Throughout the process, it will be essential to distinguish between the data that is introduced to the quantizer from the data that is produced by the quantizer and used to recreate an image. Referring to FIG. 6, in step 600 tables of distortions and entropies associated with each of several eligible quantization scales for each band are computed. In step 602, an algorithm is applied to compute an estimate for the optimal quantization schedule for all bands that will minimize total distortion while keeping total entropy below $H_{max}$. In step 604, the uppermost band m is actually assigned the quantization scale determined by the quantization schedule from step 602 and band m is quantized accordingly. In step 606, the prediction function is applied to the quantized band m resulting from the previous step in order to produce a prediction for the next highest band m−1. Note that since band m has already been quantized at this point, the amount of entropy $H_m$ contained in this quantized band is subtracted from $H_{max}$, leaving a new entropy cap of $H_{max-Hm}$ for the remaining bands. In step 608, the range of possible quantization scales for each remaining band is reconsidered in light of the new entropy constraint, and the entropy and perceptual error associated with each band and each quantization scale are once again calculated and tabulated. In this step, the entropy and perceptual error for the newly predicted band are computed using this prediction from quantized data rather than the original Predictive pyramid. For all lower bands, in one embodiment the Predictive pyramid is still used to compute entropies and perceptual errors. In an alternative embodiment, the data in the Predictive pyramid is modified to reflect random noise due to the quantization at a higher level before entropies and perceptual errors are recomputed. In step 610, as in step 602, an algorithm is applied to estimate the optimal quantization schedule for all remaining bands that will minimize total distortion while keeping total entropy below the updated entropy cap. In step 612, the highest remaining band is quantized using the quantization scale determined by the quantization schedule resulting from step 610. In step 614, the process determines whether there are any more bands below the one just quantized. If the answer is yes, step 606 is carried out on the last quantized band to predict the next lower band, and then steps 608–614 are repeated in order. If the answer in step 614 is no, then the quantization process for the current frame is complete.

In step 600, the Filtered pyramid and the Predictive pyramid for an image and a finite list of possible quantization scales for each band are taken as inputs. These data are used to compute tables containing the perceptual error and the entropy associated with each quantization scale at each band. In the preferred embodiment, the perceptual errors and entropies for each band and for each quantization scale are computed as follows: A Difference pyramid is formed from the Filtered and Predictive pyramids, as discussed in the Description of the Related Art section above. Histograms summarizing the number of pixels in each band of the Difference pyramid at each color value are created. For a given band j and a given quantization scale, a new histogram is created showing the number of pixels in each range of color values, where the ranges of color values are determined by the given quantization scale. This quantized histogram is used to compute the entropy according to the aforementioned formula $$H = -\left(\frac{1}{N}\right)\sum_{i=1}^{n} N_i \log_2\left(\frac{N_i}{N}\right),$$

where there are n bins or size ranges, $N_i$ is the number of pixels in the $i^{th}$ bin, and $$N = \sum_{i=1}^{n} N_i.$$

The perceptual error can be computed by comparing the original histogram for band j with the quantized histogram. According to the aforementioned formula, if the pixels of the $j^{th}$ band of the Difference pyramid are enumerated as $d_{ij}$, then the perceptual error is $$P_{error}^j = w_j \sum_{i=1}^{M_j} [Q(d_{i,j}) - d_{i,j}]^2,$$

where $Q(d_{i,j})$ is the quantized value corresponding to $d_{i,j}$, where $M_j$ is the number of pixels in band j, and where $w_j$ is a weighting factor. Using the histogrammed data rather than enumerated pixel data for the Difference pyramid, an alternative but equivalent formula may be used to compute perceptual error. Let $N_i$ be the number of pixels in the $i^{th}$ bin of the quantized histogram, as before, and let $N_{i,k}$ for k=1, 2, . . . , $K_i$ be the number of pixels in each of the $K_i$ bins of the histogrammed Difference pyramid that fall within the $i^{th}$ bin of the quantized histogram $$\left(\text{so that } N_i = \sum_{k=1}^{K_i} N_{i,k}\right).$$

Let $v_{i,k}$ be the color value for bin $N_{i,k}$ of the unquantized histogram, and let $q_i$ be the quantized value for bin $N_i$ of the quantized histogram. Then the alternative formula is $$P_{error}^j = w_j \sum_{i=1}^{n} \left[\sum_{k=1}^{K_i} N_{i,k}(v_{i,j} - q_i)^2\right].$$

Using this formula to compute perceptual error directly from histogram data is more efficient since the squared error is only computed once for all pixels with a given color value.

In the preferred embodiment, the weighting factors $w_j$ are used to adjust the perceptual errors for the different bands so that the adjusted values better reflect each band's relative effect on the distortion perceived by the Human Visual System. Also in the preferred embodiment, this weighted perceptual error and entropy data for each band and each quantization scale is stored in an array with each row comprising a different band, each column representing a different quantization scale, and each entry in the array containing three items: a description of that quantization scale, the (weighted) perceptual error for that band at that scale, and the entropy for that band at that scale. If a first index i represents the band number and a second index j denotes the quantization choice, then $q_{i,j}$, $p_{i,j}$, and $h_{i,j}$ represent the quantization scale, perceptual error, and entropy, respectively, associated with band i and quantization choice j. One with ordinary skill in the art can envision a variety of other ways to measure perceptual error and bit demand and to organize this data, any of which is suitable for use in the present invention. In any embodiment, it is essential that some measures of perceptual error and bit demand for each quantization scale and each band be recorded for use in the next step.

In step 602, the data generated in step 600 is used to find a quantization schedule, comprising a specific choice of quantization scale for each band of the pyramid, that minimizes the total perceptual error for all bands subject to the constraint that the total entropy for all quantized bands must be less than $H_{max}$. Since these choices are made from a finite number of possible quantization scales at each band of the pyramid, the selection problem is combinatorial in nature. With reference to the above notation, the problem may be stated as: find indices $k_1$, $k_2$, . . . , $k_m$, such that $$\sum_{i=1}^{m} p_{i,k_i}$$

is minimized subject to the constraint $$\sum_{i=1}^{m} h_{i,k_i} < H_{max}.$$

Any of a variety of methods may be used to select the optimal combination of quantization scales from among all possibilities that meet the entropy constraint.

Figure 7A:
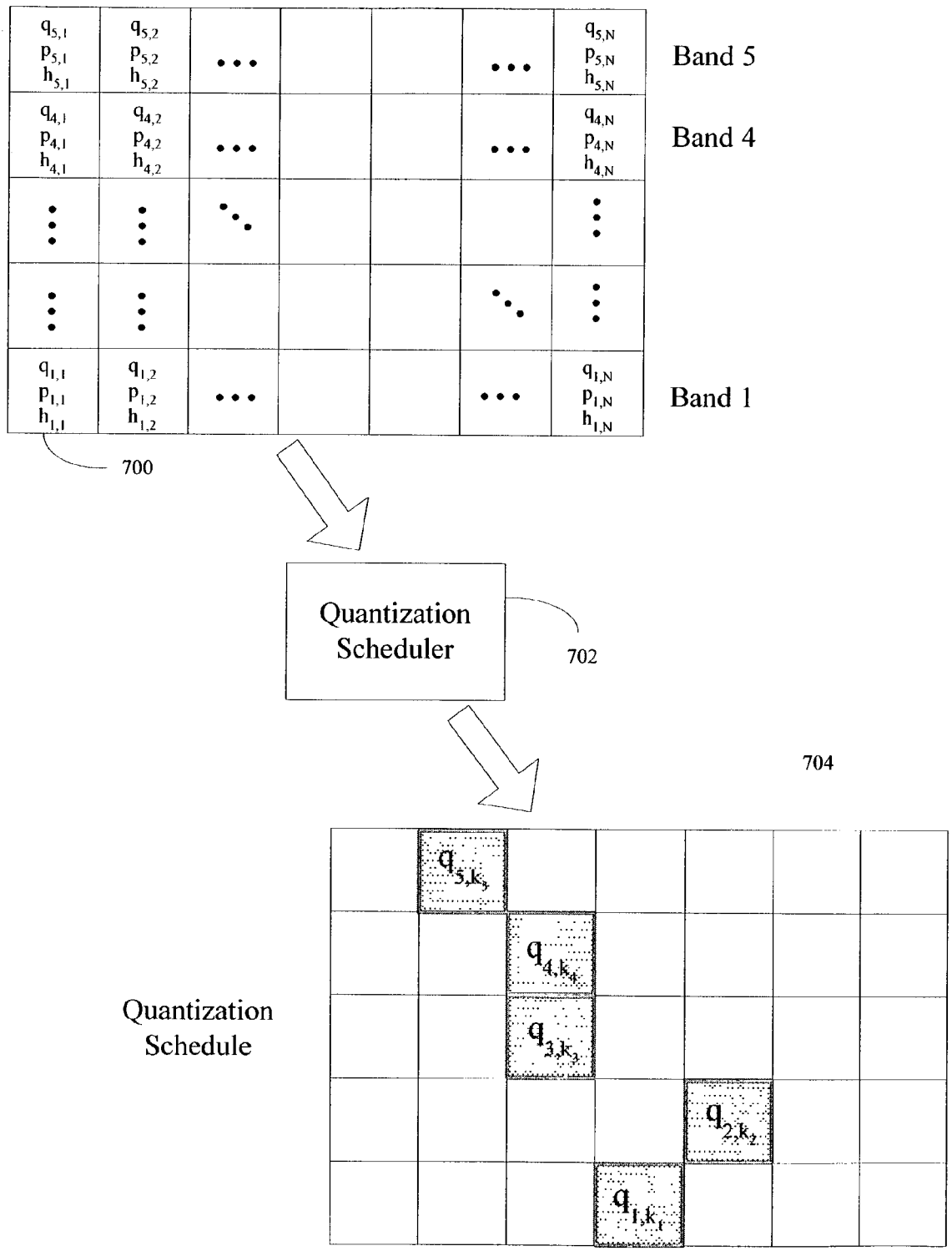
FIG. 7a is a heuristic diagram illustrating the process of selecting a quantization schedule from amongst a finite number of quantization choices at each band in accordance with an embodiment of the invention.

FIG. 7a provides a heuristic diagram of the selection of a quantization schedule in step 602. A table 700 containing the quantization scale $q_{i,j}$, the perceptual error $p_{i,j}$, and the entropy $h_{i,j}$ for the $j^{th}$ quantization choice and the $i^{th}$ band is introduced from step 600. In this example, there are 5 rows corresponding to 5 bands for simplicity, so m=5, but in general the number of bands m may be any integer greater than 1. A quantization scheduler 702 uses some algorithm to select one index $k_i$ for each row i. The quantization scheduler then provides a list of the selected quantization scales ($q_{1,k_1}$, $q_{2,k_2}$, . . . , $q_{m,k_m}$), which comprise a quantization schedule. The quantization schedule is illustrated graphically in table 704, with the highlighted position in each row indicating the choice of quantization scale for the corresponding band.

In the preferred embodiment, a dynamic programming algorithm is applied to select the indices $k_i$ for the optimal quantization schedule. Dynamic programming is a method for solving recursive problems in which information is stored at intermediate steps to obviate the need for repetitive calculations. The algorithm keeps track of the cost (in terms of cumulative perceptual error) and the entropy consumption of each combination of quantization scales as it proceeds from the lowest band to the highest. Along the way, the algorithm prunes partial combinations that violate the entropy constraint or that are clearly suboptimal in terms of perceptual error, thereby greatly reducing the computations needed for each band.

FIG. 7b illustrates the algorithm in terms of a graph representing quantization choices for three bands. For each band, three quantization choices are considered. In graph 710, three edges leading from an initial node 712 represent the three possible quantization choices for the first band. Three edges representing three possible quantization choices for the second band lead from each node at the end of a first band edge, and three edges representing three possible quantization choices for the third band lead from each second band node. A weight representing perceptual error is attached to each edge. The horizontal displacement of each edge represents the amount of entropy associated with the corresponding quantization choice, so that a node that is further to the right indicates a choice (or combination of choices) that requires more entropy. Each descending path from initial node 712 down to a terminal (band 3) node represents a possible combination of quantization choices. There are $3^3=27$ total combinations. Since multiple paths sometimes lead to the same total entropy expenditure, there are only 12 terminal nodes, meaning there are twelve potential entropy expenditures. Note that the rightmost two terminal nodes represent total entropy greater than $H_{max}$, so paths leading to these nodes are not eligible combinations.

Graph 720 shows the smaller number of paths considered by the dynamic programming algorithm. This algorithm constructs the graph in downward fashion, one band at a time, so that only one path leading to each node is kept. At each band, if multiple paths lead to the same node (meaning they have the same entropy expenditure), then only the path with least cumulative perceptual error is kept. The cumulative perceptual error associated with the best path leading to a node is stored in memory. For instance, nodes 722 and 724 each have two paths leading to them. The broken line segments represent paths that have higher cumulative perceptual error than the alternative paths, so these segments are removed and only the lowest cost path leading to each node is retained. Similarly, as choices for band 3 quantization are added, many more groups of paths leading to the same entropy expenditure occur, so all edges except the ones representing the lowest perceptual error path to each node are pruned. Terminal nodes 726 and 728 require a total entropy expenditure greater than $H_{max}$. Thus, all paths leading to these nodes represent ineligible combinations, so they are removed from consideration. Finally, after this pruning has been carried out, each band 3 terminal node corresponds to a single path, and thus to a single combination of quantization choices. In this example, 10 paths remain (as opposed to 27 paths if none had been pruned). One of these paths is selected as the one with the least cumulative perceptual error, and the quantization choices selected along this path determine the optimal quantization schedule. The highlighted path leading to node 730 represents the optimal path for this example. The algorithm returns the indices $k_1$, $k_2$, $k_3$ that defined the optimal path.

For a decomposition into m bands, the dynamic programming algorithm of the preferred embodiment constructs paths of increasing length as in the FIG. 7b example by considering all possible quantization choices at each new band and by keeping only those paths that have smallest perceptual error for their total entropy (and that meet the entropy constraint). The number of paths pruned by these operations can be quite large, especially when the number of bands is large. When band m is reached, the remaining path with smallest total perceptual error determines the optimal quantization schedule.

The advantage of this algorithm lies in the reduction of the number of combinations that must be considered while guaranteeing an optimal solution. For an image decomposition with m bands and n quantization choices for each band, the total number of quantization combinations is $n^m$, while the total number of choices considered by the dynamic programming algorithm is bounded by $H_{max}$ since only one path is kept for each entropy level. This algorithm requires $O(n \cdot m \cdot H_{max})$ calculations to determine this list of choices, while a purely recursive approach would require $O(n^m)$ calculations. Clearly when m and n are of appreciable size the dynamic programming algorithm results in significant computational savings. In step 604, the quantization schedule chosen in step 602 is used to determine the quantization scale for the top band m of the pyramid. Note that the top band is the same in the Filtered and Predictive pyramids. The pixel data for this band, $a_{i,m}$ for i=1 to $M_m$, is quantized according to the chosen quantization scale, resulting in quantized top band data $Q(a_{i,m})$. For simplicity, let $A_m$ denote the entirety of the data for band m of the Filtered pyramid, and let $Q(A_m)$ denote the quantized version of this band. In applications to image or video compression, this quantized data is sent to the decoder, and the decoder can use it to predict the next band of the pyramid. In such applications, the encoder may also store a copy of this data as the top band of the reconstruction pyramid that will be used by the decoder to reconstruct the original image.

In step 606, the prediction function is applied to the quantized top band data from step 604 to create a prediction for the next highest band m−1. The prediction function, which was specified as an input at the beginning of the process, is the same function that was used to create the Predictive pyramid from the Filtered pyramid. One skilled in the art can readily envision a number of prediction filters, either linear or nonlinear, which are compatible with this process. In particular, the prediction filter may not be uniform for all pixels, but may rather take into account image characteristics such as boundary or object information.

Note that during the prediction of a band j−1 from band j, there are typically two classes of pixels to be predicted. The first class is comprised of pixels in band j−1 that also appear in the downsampled band j. The second class consists of pixels that are excluded from band j and that reside in the interstitial regions between the pixels in band j.

Figure 8:
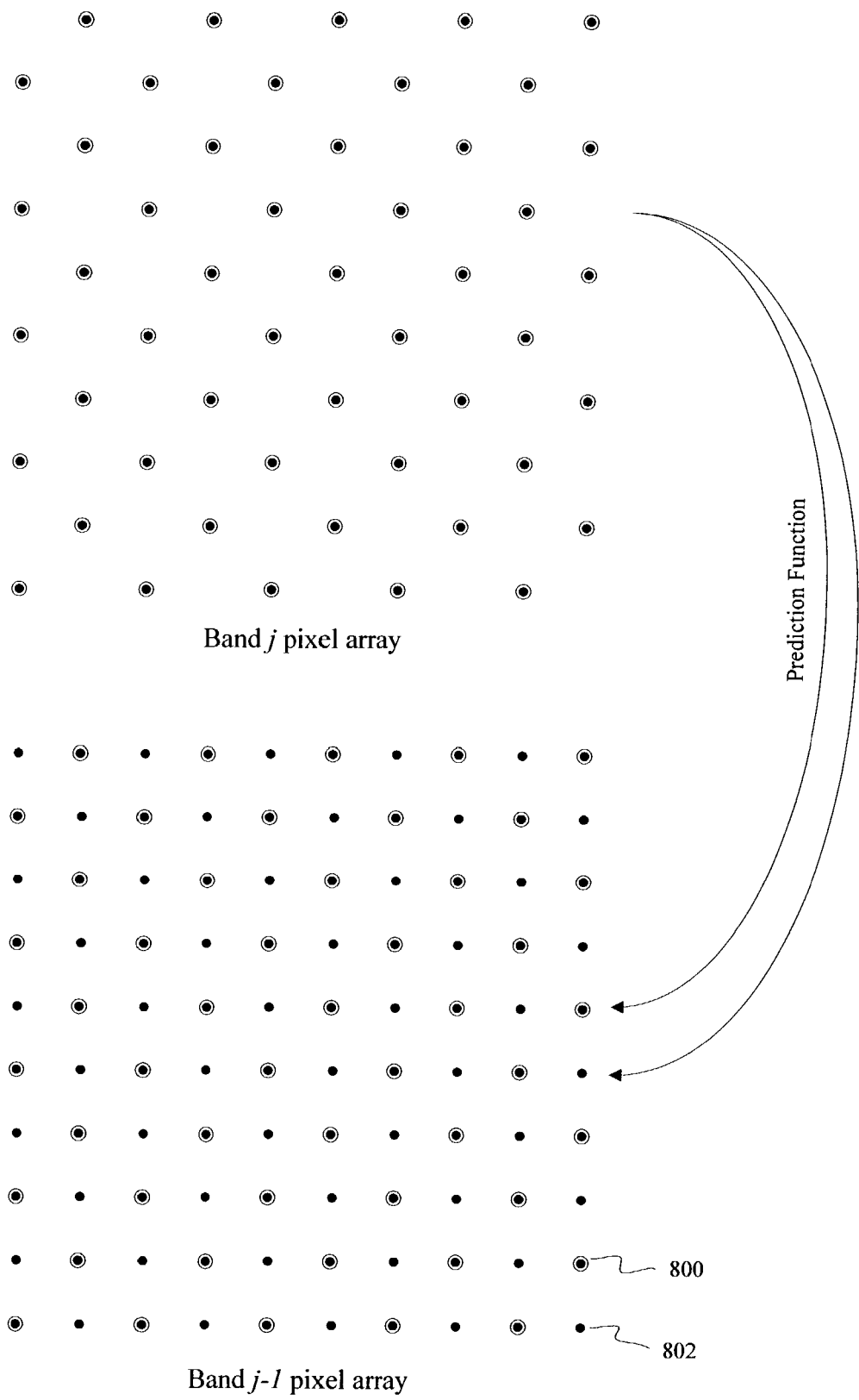
FIG. 8 shows an example of the arrangements of pixels in two consecutive bands of a pyramidal image decomposition.

FIG. 8 shows an example of the arrangements of pixels in two consecutive bands of a pyramidal image decomposition. The lower band j−1 is comprised of pixels of type 800 (circled dots) and pixels of type 802 (dots without circles). The higher band j is comprised only of pixels of type 800. Note that only the positions of the circled dots 800 in band j−1 and in band j are assumed to be the same, not the actual values associated with these pixels. In this illustrative example, the higher band pixels lie along the quincunx lattice, but many other possible lattice structures for downsampling in the creation of an image pyramid are possible and consistent with the present invention.

It is envisioned that the prediction function may treat these two classes of pixels differently. For instance, pixels of type 802 might be predicted using the values of surrounding pixels of type 800 at the higher band j, and pixels of type 800 might then be predicted using the results of these predictions for the pixels of type 802. In other words, pixels of type 800 may be predicted using not only data from pixels in band j but also using data for the predicted values of type 802 pixels in band j−1. This process for pixels of type 800 is called inverse updating, since it in effect updates values for pixels that already had values at a higher band in the pyramid. In one embodiment, the inverse updates are handled as a separate stream of data, so that the new data generated at each band j consists only of the pixels that first appear at that band. This distinction is not viewed as fundamental for the remainder of the specification since at the end of the prediction process, including inverse updates, a complete prediction for the lower band is formed.

Returning to step 606, note that in general the band m−1 data predicted in this step, which is referred to herein as the "predicted-from-quantized" band m−1, will differ from band m−1 of the Predictive pyramid, which is referred to herein as the "predicted-from-raw" band m−1. The data for the predicted-from-quantized band m−1 is summarized with the notation $P_{Q,m-1}$ and the data for the predicted-from-raw band m−1 is summarized as $P_{R,m-1}$. The data for band m−1 of the Filtered pyramid is summarized as $A_{m-1}$. As a result of this discrepancy, the difference $A_{m-1} - P_{Q,m-1} = D_{Q,m-1}$ is not exactly the same as the difference $A_{m-1} - P_{R,m-1} = D_{R,m-1}$. But the difference $D_{R,m-1}$ was used in step 600 above to compute perceptual errors and entropies, and this difference was thus used in step 602 above to select an optimal quantization schedule (which included a choice of quantization scale for band m−1). The point of encoding an error term is to correct $P_{Q,m-1}$ to make it as close as possible to $A_{m-1}$, so the process uses the difference $D_{Q,m-1} = A_{m-1} - P_{Q,m-1}$ rather than $D_{R,m-1}$ as the error term. This error term also needs to be quantized, but the band m−1 quantization scale pre-selected in step 602 was designed to minimize perceptual error for the difference $D_{R,m-1}$, not to minimize perceptual error for the error term $D_{Q,m-1}$. To solve this problem, the next two steps of the process make a new choice of quantization scale for band m−1 in light of the new information.

In step 608, the possible quantization scales for all remaining bands are reevaluated and the table of perceptual errors and entropies for each remaining band at each quantization scale is recomputed. The reason for reevaluating the possible quantization scales for all remaining bands is that some entropy, $H_m$, has already been expended in quantizing the top band m in step 604. As a result, the entropy limit for all remaining bands is now $H_{max} - H_m$. For each remaining band, only quantization scales that result in an entropy for that band below the new limit of $H_{max} - H_m$ need be considered.

In one embodiment, the possible quantization scales for each remaining band will be completely reassigned in a manner that depends on $H_{max} - H_m$ so that the same total number of possible quantization scales under consideration for each band is preserved. In another embodiment, quantization scales that cause a band by itself to violate the entropy cap $H_{max} - H_m$ are eliminated, and all other original possible quantization scales are preserved without change. Given the new assignment of possible quantization scales, perceptual error and entropy for each band and each quantization scale are computed as before. In case the same quantization scale appeared in the earlier version of these tables, the perceptual error and entropy need not be recomputed but may simply be retained. An exception exists, however. For the band that has just been predicted from quantized data (band m−1), perceptual errors and entropies must be recomputed using predicted-from-quantized band m−1 as mentioned above. More specifically, the difference $D_{Q,m-1} = A_{m-1} - P_{Q,m-1}$ now enters the calculations for perceptual error and entropy in place of $\{d_{i,m-1}\}$ above. The resulting updated tables of perceptual error and entropy provide more accurate information with which to make ensuing choices of quantization scales for the remaining bands.

In one embodiment, quantization error is modeled in the data for lower bands before the perceptual error and entropy is recomputed. In this embodiment, the histogrammed data for the remaining bands of the Predictive pyramid are modified to reflect the random noise introduced by quantization at a higher level. For instance, the histograms for the remaining bands of the Predictive pyramid may be convolved with a smoothing function such as a Gaussian kernel of width q, where q is the size of the quantization scale chosen for the last band to be quantized. In this context, convolution corresponds to replacing the heights of each bin with an average of the heights of neighboring bins, where the average is weighted according to a convolution kernel. The convolution kernel distributes weights across a finite range of bins so that the sum of the weights is one. In a Gaussian kernel, weights follow a bell-shaped distribution (as in the well-know Gaussian distribution in statistics). Such convolution models the introduction of quantization noise to the remaining histogrammed data and thus may provide for a better approximation when recomputing perceptual errors and entropies (by the method discussed above in step 600). While the subject will be familiar to one with ordinary skill in the art of signal processing, background information on the theory of discrete convolutions may be found in the survey text *Digital Signal Processing: Principles, Algorithms, and Applications*, by John G. Proakis and Dimitris G. Manolakis, Prentice Hall, 1996, pp. 72–85.

In step 610, the data generated in step 608 is used to find a quantization schedule, comprising a specific choice of quantization scale for each remaining band of the pyramid, that minimizes the total perceptual error for all remaining bands subject to the constraint that the total entropy for all remaining quantized bands must be less than the new entropy limit $H_{max} - H_m$. Step 610 proceeds in the same manner as step 602, only it operates with a different entropy cap and produces a quantization schedule only for the remaining bands whose error terms have yet to be quantized.

In step 612, the quantization schedule chosen in step 610 is used to determine the quantization scale for the highest remaining unquantized band (m−1) of the pyramid. The error term for this band, $D_{Q,m-1}$, is quantized according to the chosen quantization scale, resulting in a quantized band m−1 error term $Q(D_{Q,m-1})$. This quantized band m−1 error term $Q(D_{Q,m-1})$ is added to $P_{Q,m-1}$ to result in what is called "reconstructed" band m−1, denoted by $B_{m-1}$. In applications to image or video compression, the quantized band m−1 error term $Q(D_{Q,m-1})$ is sent to the decoder, and the decoder can add its own predicted-from-quantized band m−1 ($P_{Q,m-1}$) to this error term to form its own reconstructed band m−1, $B_{m-1}$. In such applications, the encoder may also store $B_{m-1}$ as a model of band m−1 of the reconstruction pyramid that will be used by the decoder to reconstruct the original image.

Step 614 determines whether any lower bands remain to be quantized. If lower bands remain, then the process returns to step 606 to predict the next lower band in terms of the previously quantized band. (In this case, the discussion of step 606 applies to "the next lower band" instead of "band m−1.") Step 608 then once again recomputes the perceptual error and entropy terms in light of the new prediction and in light of a further reduced entropy limit, step 610 again generates a new optimal quantization schedule, and step 612 again quantizes the next lower band according to the schedule generated in step 610. This process continues recursively until no lower bands remain to be quantized in step 614. At this point, the entire image pyramid has been quantized within the total entropy constraint and so the process for the given image is complete.

3 Bit Allocation Apparatus

Figure 9:
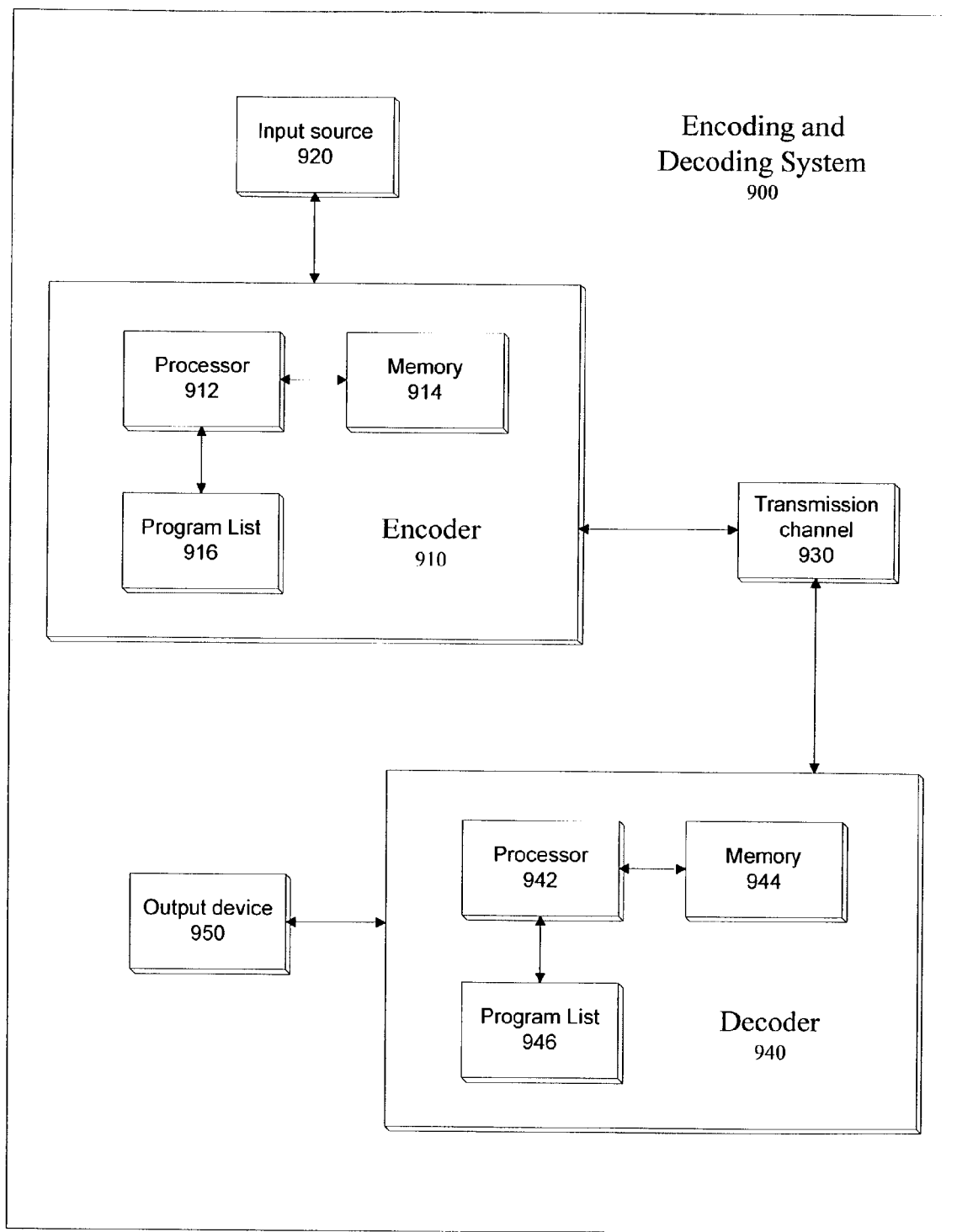
FIG. 9 illustrates the features of an encoding and decoding system including means to carry out the bit allocation process disclosed herein.

FIG. 9 shows a system 900 for encoding and decoding image data that includes means for allocating bits by the above process. An encoder 910 includes a processor 912, memory 914, and a program list 916. The program list 916 instructs the processor 912 to carry out various operations and to store necessary data in memory 914. These features in combination provide means for calculating distortion terms and bit demand associated with each of one or more quantization scales and one or more stages of image compression. Features 912, 914, and 916 also provide means for selecting a quantization schedule for all stages, means for quantizing a first stage of compression and outputting the result, means for updating the bit constraint, means for recalculating distortion terms and bit demand, and means for repeating these operations until all stages of image compression are completed.

FIG. 9 also shows an input source 920, which provides image data to be compressed, and a transmission channel 930 through which compressed data is transmitted. Transmission channel 930 may include means for storage of the compressed data, such as a hard magnetic disk or an optical disk or an equivalent. The compressed data may be transmitted as a bitstream to a decoder 940.

The decoder 940 includes a processor 942, memory 944, and a program list 916. Using these features in combination, the decoder 940 is able to reconstruct images from the compressed bitstream. In particular, the decoder 940 combines the different stages of the compressed data in a way that matches the process carried out by the encoder 910. In the case of pyramidal image compression, the decoder 940 employs the same prediction function used by the encoder 910 so that the bit allocation process described herein and carried out by the encoder 910 provides for optimal image reproduction by the decoder 940. The decoder 940 may output the reconstructed image data to an output device 950, which may be for example a computer display, television set, projection system, or other media display device.

The encoding and decoding system 900 is extendable so that more than one encoder and more than one decoder may be combined through one or more output/transmission channels. It is envisioned that said system will provide quality image or video streams to a plurality of users (employing decoders) from a single source (encoder).

Note that the features of both the encoder 910 and the decoder 940 may be embodied within a computer (including a personal computer, a network server, or any other computer architecture) so that the program list (916, 946) instructs the computer's CPU and memory to carry out the operations described herein. The features of both the encoder 910 and the decoder 940 may also be embodied as hardware devices, including both processing and memory units, which are designed to carry out a sequence of operations including the specific operations detailed herein.

4 Conclusion, Ramifications, and Scope

The preferred embodiment of the disclosed process provides an effective and efficient solution to the problem allocating a constrained number of bits during closed-loop coding of a pyramidal image decomposition. As such, the process may be applied to increase the accuracy and efficiency of image or video compression schemes, including image or video compression schemes that employ nonlinear filters. The present invention may be adapted by one with ordinary skill in the art to apply to any compression scheme in which quantization choices are interdependent. For instance, the sequential quantization of bands in a pyramidal scheme may be parlayed into sequential quantization of different frames in predictive coding of a video sequence with only minor adjustments.

While the problem of bit allocation in image compression has been well studied, a survey of the prior art reveals no truly satisfactory technique for allocating bits within a closed-loop pyramidal coding scheme. Existing proposals either make assumptions on the nature of the source data, limiting their applicability to a practical video compression scheme, or demand oversimplifications or complex calculations. The present invention fills this void with an efficient, versatile, and accurate allocation process and thus marks a significant advance in the field.

The above description is illustrative and not restrictive. The scope of the invention should, therefore, be determined not with reference to the above description, but instead should be determined with reference to the appended claims along with their full scope of equivalents.

What is claimed is:

1. A process for allocating bits for a multi-stage digital image compression such that image quality is optimized subject to a constraint on maximum bit allowance, said process comprising:
    a) calculating a distortion term and a bit demand measure associated with each of a finite number of possible quantization scales for each stage of the image compression;
    b) selecting a combination of quantization scales for all stages that minimizes total distortion subject to a constraint on maximum bit demand;
    c) allocating to a first stage of compression a number of bits required to quantize the first stage with the quantization scale selected for the first stage, and updating the constraint on maximum bit demand by subtracting off the bit demand associated with the quantized first stage; and
    d) recalculating the distortion terms and the bit demand measures associated with each of the finite number of possible quantization scales for each remaining stage of the image compression in light of the quantization of a previous stage, wherein the image compression includes pyramidal image decomposition and wherein the stages of compression comprise encoding the various bands of an image pyramid.

2. The process of claim 1, further comprising:
    e) recursive application of analogues of steps b) through d), wherein the words first stage are replaced with current stage, until quantization scales and thus bit allocations have been selected for all stages of the image compression.

3. The process of claim 1, where dependencies in the multi-stage compression process imply that distortion and bit demand data for at least one later stage of the process will be affected by the quantization performed at a previous stage.

4. The process of claim 1 wherein a predict function used in the pyramidal decomposition involves an inverse update step, which updates values for pixels in a lower band that also appeared in a previous downsampled higher band.

5. The process of claim 1 wherein step d) further comprises modifying data for remaining stages by convolving histograms for each remaining band with a smoothing function of width corresponding to the previously selected quantization scale before recomputing distortion terms and bit demand measures.

6. The process of claim 1 wherein the distortion term calculated for each stage and each quantization scale comprises a weighted squared error.

7. The process of claim 1 wherein the distortion term calculated for each stage and each quantization scale comprises a peak signal-to-noise ratio (PSNR).

8. The process of claim 1 wherein the selection of the combination of quantization scales in step b) is made using a dynamic programming algorithm.

9. An apparatus for allocating bits for a multi-stage digital image compression scheme such that image quality is optimized subject to a constraint on the maximum bit allowance, said apparatus comprising:
    a) means for calculating a distortion term and a bit demand measure associated with each of a finite number of possible quantization scales for each stage of the image compression;

b) means for selecting a combination of quantization scales for all stages that minimizes total distortion subject to a constraint on maximum bit demand;

c) means for allocating to a first stage of compression a number of bits required to quantize the first stage with the quantization scale selected for the first stage, and means for updating the constraint on maximum bit demand by subtracting off the bit demand associated with the quantized first stage; and d) means for recalculating the distortion terms and the bit demand measures associated with each of the finite number of possible quantization scales for each remaining stage of the image compression in light of the quantization of a previous stage, wherein the image compression includes pyramidal image decomposition and wherein the stages comprise encoding the various bands of an image pyramid.

10. The apparatus of claim 9, further comprising:

e) means to recursively apply steps b) through d), wherein the words first stage are replaced with current stage, until quantization scales and thus bit allocations have been selected for all stages of the image compression.

11. The apparatus of claim 9, where dependencies in the multi-stage compression process imply that distortion and bit demand data for at least one later stage of the process will be affected by the quantization performed at a previous stage.

12. The apparatus of claim 9 wherein a predict function used in the pyramidal decomposition involves an inverse update step, which updates values for pixels in a lower band that also appeared in a previous downsampled higher band.

13. The apparatus of claim 9 wherein step d) further comprises modifying data for remaining stages by convolving histograms for each remaining band with a smoothing function of width corresponding to the previously selected quantization scale before recomputing distortion terms and bit demand measures.

14. The apparatus of claim 9 wherein the distortion term calculated for each stage and each quantization scale comprises a weighed squared error.

15. The apparatus of claim 9 wherein the distortion term calculated for each stage and each quantization scale comprises a peak signal-to-noise ratio (PSNR).

16. The apparatus of claim 9 wherein the means for selecting the combination of quantization scales is made using a dynamic programming algorithm.

17. A system for encoding and decoding a compressed digital image, said system including the bit allocation apparatus of claim 9.

* * * * *